Oct. 8, 1968
G. M. DONLIN
3,405,022
EDGE BANDING MACHINE
Filed July 6, 1965
6 Sheets-Sheet 1
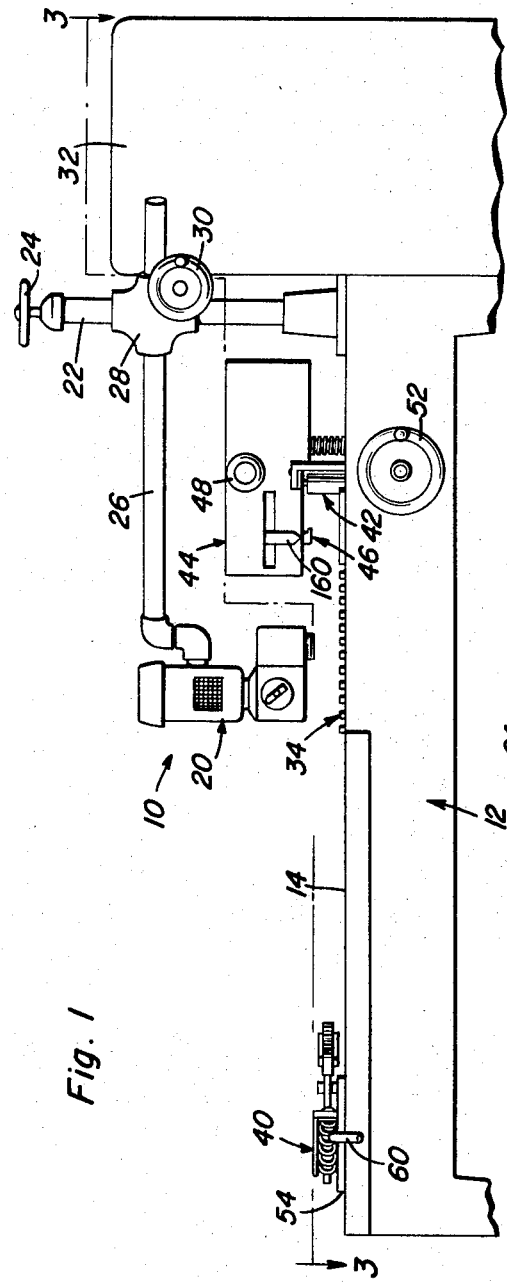
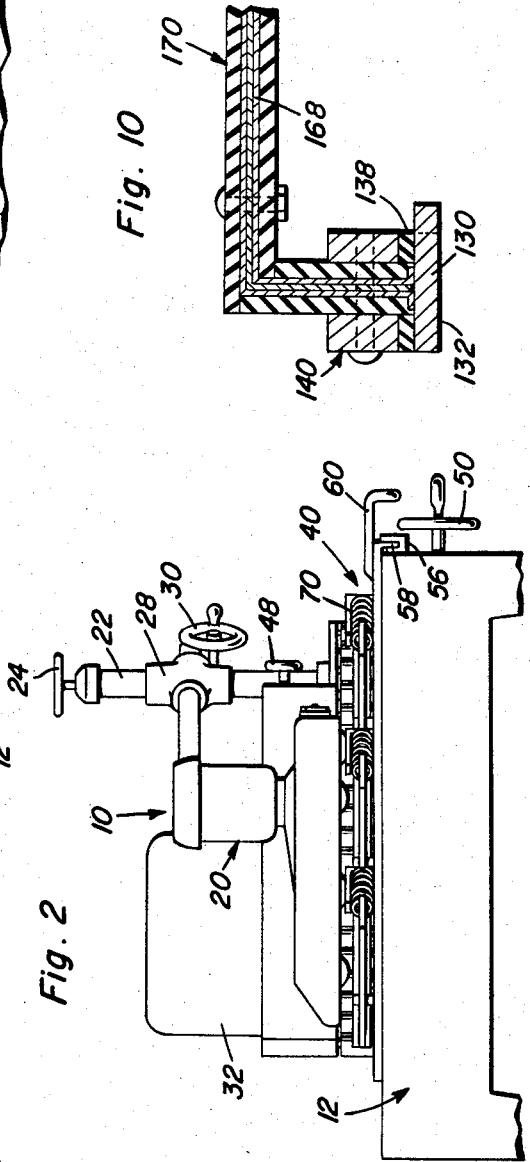
Gerald M. Donlin
INVENTOR.
BY *Clarence A. O'Brien*
*and Harvey B. Jacobson*
Attorneys

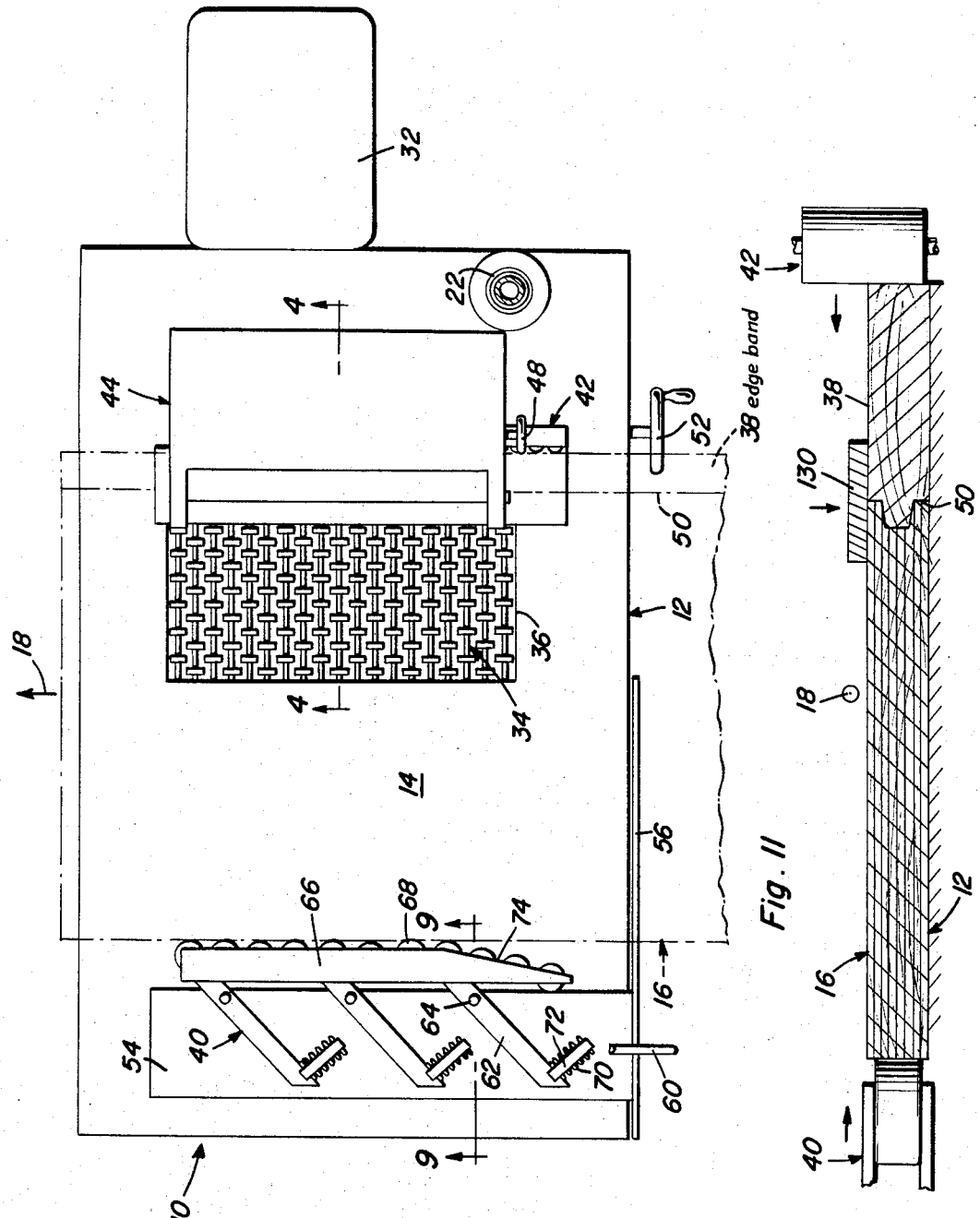

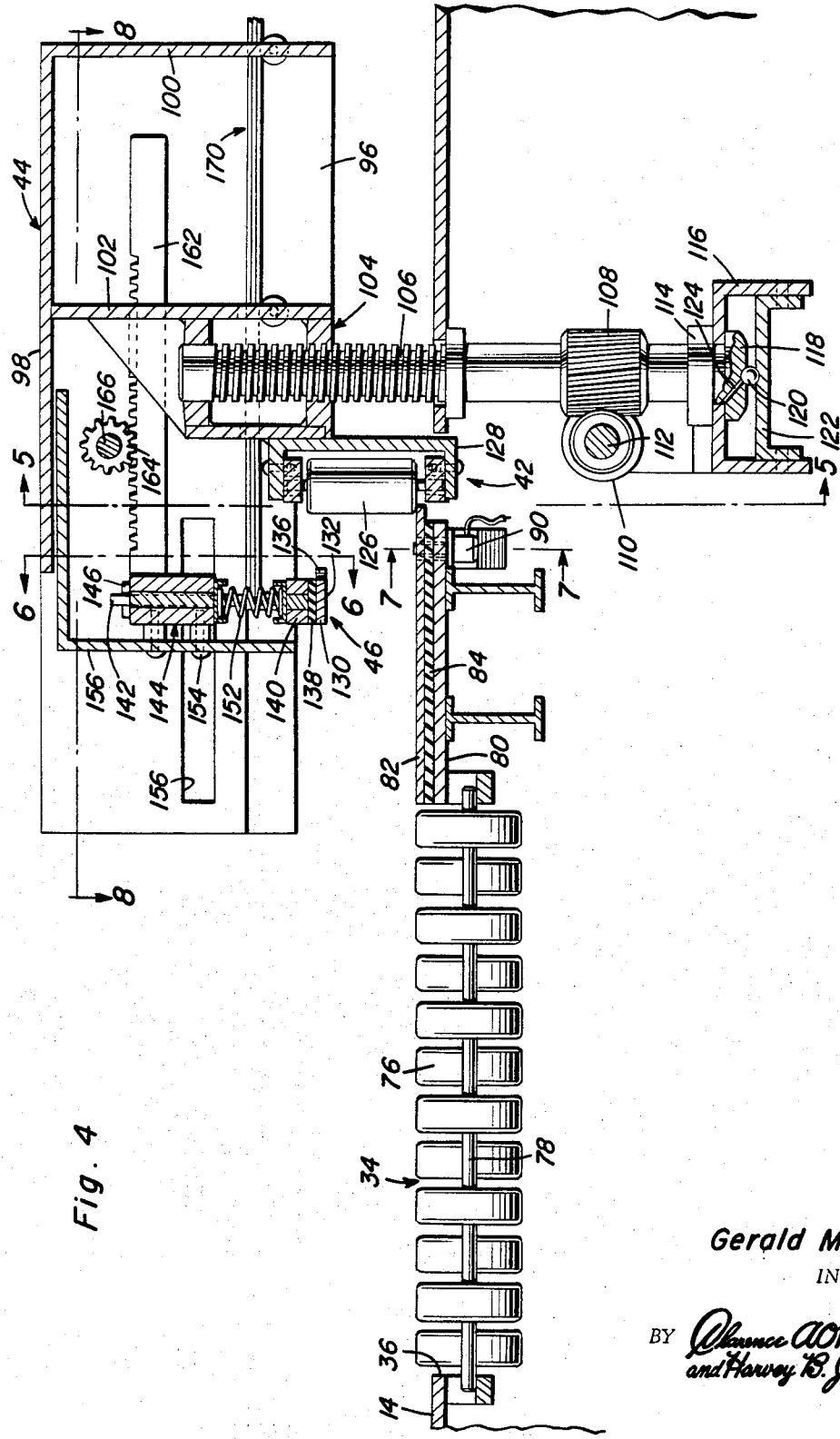

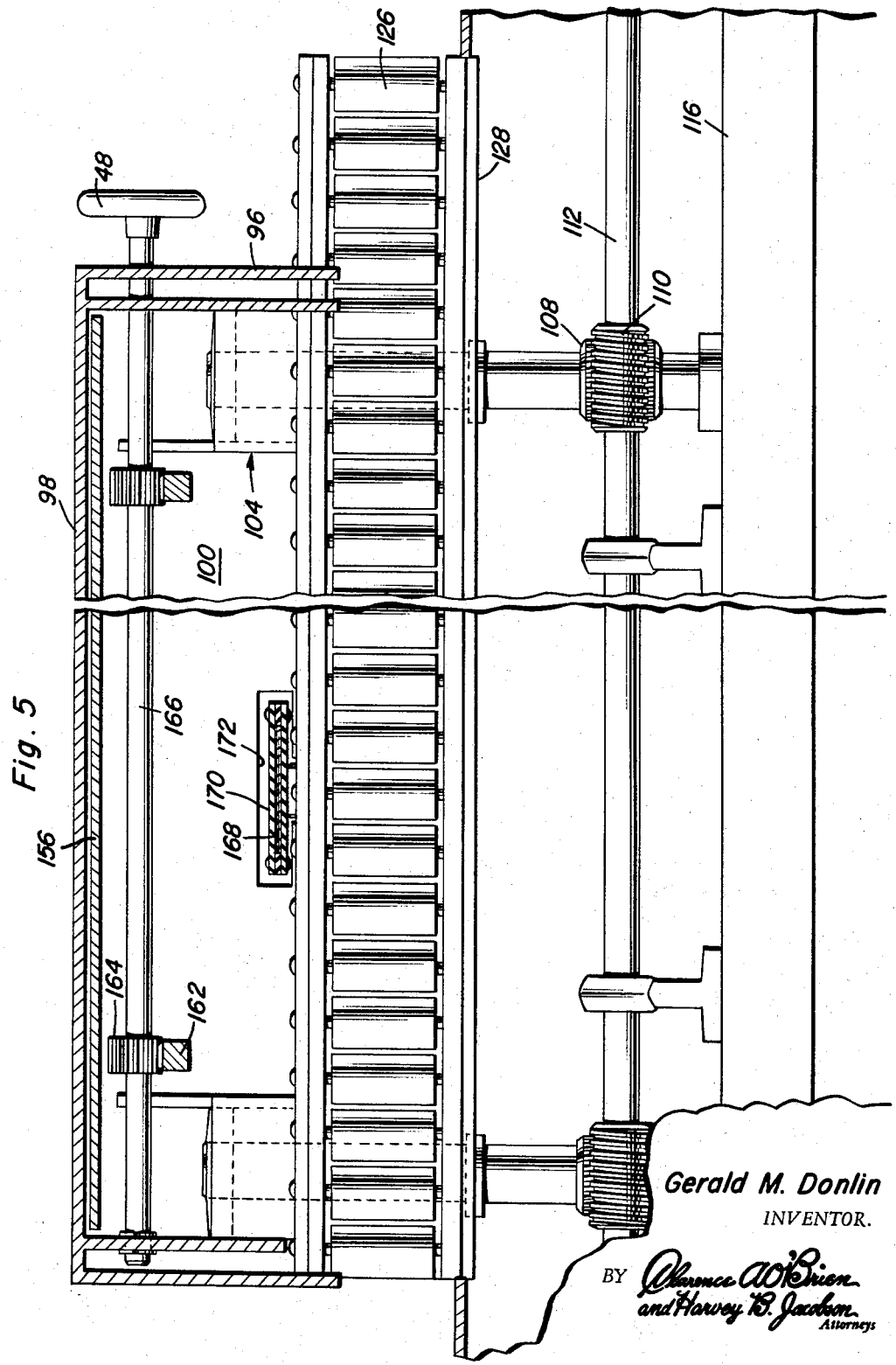

Oct. 8, 1968

G. M. DONLIN 3,405,022

EDGE BANDING MACHINE

Filed July 6, 1965

Gerald M. Donlin
INVENTOR.

BY *Clarence A. O'Brien*
*and Harvey B. Jacobson*
Attorneys

United States Patent Office 3,405,022
Patented Oct. 8, 1968

3,405,022
EDGE BANDING MACHINE
Gerald M. Donlin, 1320 8th Ave. N.,
St. Cloud, Minn. 56301
Filed July 6, 1965, Ser. No. 469,651
6 Claims. (Cl. 156—380)

ABSTRACT OF THE DISCLOSURE

The banding of the edge of a panel during feed of the panel with the edge band along a roller fence through an adhesive activating energy field. Edge bands varying in thickness down to a veneer are accommodated by adjusting the position of the field establishing electrode relative to the fence so that it overlies the glue line between the panel and the edge band.

---

This invention relates to the banding of edges of workpieces by means of adhesive rapidly set by the passage of radio frequency energy therethrough and more particularly to a machine applying this edge banding method in a novel and efficient manner.

The method of banding of workpieces such as panels made of plywood or the like along an edge thereof, by use of radio frequency energy to rapidly set the adhesive coating the edge surface of the panel to which the edge band adheres, is well known. A primary object of the present invention however, is to provide a machine by means of which such banding of a workpiece may be accomplished in a more rapid manner and with less dimensional limitations on the thickness of the workpiece and the width of the edge band than was heretofore possible.

It is therefore an important object of the present invention, to provide an edge banding machine capable of banding a workpiece with an edge band varying in thickness from a thin veneer to a band of substantial width.

An additional object in accordance with the foregoing objects, is to provide an edge banding machine having an electrode surface elongated in the direction of feed of the workpiece so as to establish a radio frequency energy field which extends a substantial distance along the glue line parallel to the edge surface being banded and the direction of feed. Because of such an arrangement, there is no limitation on the length of banding capable of being handled by the machine of the present invention.

A further object of the present invention is to provide an edge banding machine which includes a roller fence vertically adjustable with the electrode, the fence being engageable with edge bands of varying thicknesses so as to resist transverse pressure applied to the workpiece and guide feeding movement of the workpiece. The edge banding machine therefore also features a pressure applying roller assembly which exerts a pressure on the workpiece transverse to the direction of feed while it is being guided in said direction.

A still further object of the present invention is to provide an adjustable supporting assembly for the electrode of the edge banding machine by virtue of which the electrode is yieldably mounted to vary the vertical pressure applied by the electrode contact surface to the workpiece and the edge band along the glue line. Also, adjustment facilities are provided for varying the spacing between the electrode surface and the fence engaged with the edge band so as to accommodate the bonding of edge bands of varying widths as aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the edge banding machine of the present invention.

FIGURE 2 is a front elevational view of the edge banding machine shown in FIGURE 1.

FIGURE 3 is a top sectional view of the edge banding machine taken substantially through a plane as viewed from section line 3—3 in FIGURE 1.

FIGURE 4 is an enlarged partial sectional view taken substantially through a plane indicated by section line 4—4 in FIGURE 3.

FIGURE 5 is a partial sectional view taken substantially through a plane indicated by section line 5—5 in FIGURE 4.

FIGURE 10 is a partial sectional view taken substantially through a plane indicated by section line 10—10 in FIGURE 6.

FIGURE 11 is a simplified sectional view illustrating the operational procedure associated with the edge banding of the present invention.

Figure 6:
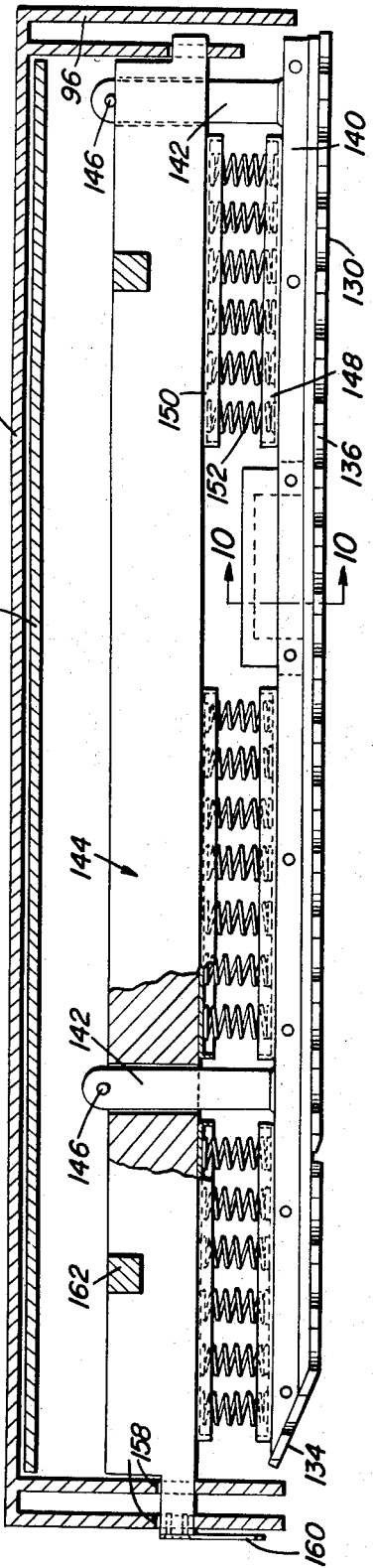
FIGURE 6 is a sectional view taken substantially through a plane indicated by section line 6—6 of FIGURE 4.

Referring initially to FIGURES 1, 2 and 3, the edge banding machine is illustrated in its entirety and is generally denoted by reference numeral 10. The machine includes a work supporting bed generally referred to by reference numeral 12 having a top horizontal supporting surface 14 over which a workpiece such as a plywood panel 16 may be fed in a direction indicated by arrow 18 as shown in FIGURE 3. The workpiece may be fed in the indicated direction by any suitable means such as a power operated feeder assembly 20 shown in FIGURES 1 and 2. The feeder assembly is therefore adjustably mounted above the bed surface for engagement with the workpiece. Toward this end a vertical adjusting post 22 may be mounted on the bed at one end for vertically adjusting the power operated feeder 20 by means of the vertical adjustment hand wheel 24. The power operated feeder assembly 20 is supported on the vertical adjustment post by means of the horizontal arm 26 which extends through the horizontal adjustment support 28 which mounts a horizontal adjustment hand wheel 30. Also connected to the supporting bed 12 at the end adjacent to the adjustment post 22, is a high frequency generator 32 through which the radio frequency energy is derived for establishing a dielectric field through the workpiece and the edge band necessary to rapidly set the adhesive.

The workpiece 16 is fed in the direction indicated by arrow 18 while it is guided over a skate roller assembly 34 mounted within an opening 36 formed in the supporting surface 14. One edge of the workpiece remote from the edge to which the edge band 38 is secured, is guided by a side pressure applying assembly generally referred to by reference numeral 40 as more clearly seen in FIGURE 3. The pressure applying assembly 40 exerts pressure on the workpiece in a direction transverse to the direction of feed. The pressure applied to the workpiece by the pressure applying assembly is resisted by a roller fence generally referred to by reference numeral 42 which engages the edge band 38. The roller fence 42 is secured to and vertically adjustable with a supporting head assembly 44 from which an electrode 46 projects downwardly. The electrode is adapted to be horizontally positioned by means of the spacing control wheel 48 so as to be aligned above the glue line 50 between the workpiece 16 and the edge band 38. The head assembly 44 together with the roller fence 42 may be vertically adjusted above the bed by means of the vertical adjustment hand wheel 52 in order to accommodate workpieces of different thicknesses.

Figure 9:
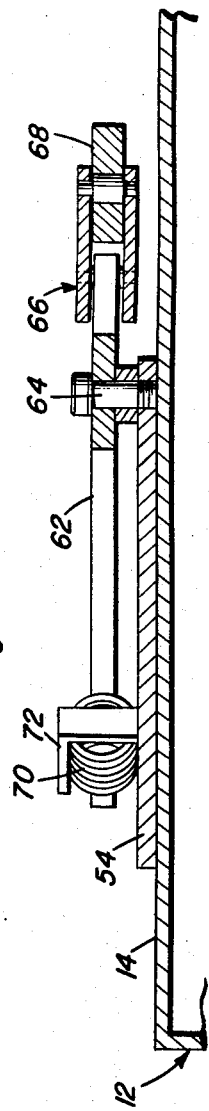
FIGURE 9 is an enlarged partial sectional view taken substantially through a plane indicated by section line 9—9 in FIGURE 3.

Referring now to FIGURES 2, 3 and 9, it will be observed that the pressure applying assembly includes a mounting plate 54 elongated in the direction of feed and slidably mounted for adjustable positioning transverse to the direction of feed by means of the guide bar 56 secured to one side of the supporting bed 12. Accordingly, one end of the supporting plate 54 is provided with a downwardly depending flange 58 as shown in FIGURE 2 received within the guide 56. A handle 60 is secured to the supporting plate so that it may be manually repositioned in order to accommodate workpieces of different widths. Pivotally mounted adjacent one longitudinal edge of the mounting plate 54 are a plurality of lever elements 62, each lever element being pivoted on the mounting plate by means of the pivot stud 64. The ends of the lever elements 62 which project beyond the longitudinal edge of the mounting plate, are pivotally connected to an elongated roller mounting plate assembly 66. A plurality of edge engaging rollers 68 are rotatably mounted by the plate assembly 66 and project therefrom for engagement with an edge of the workpiece. The ends of the lever elements 62 remote from the roller plate assembly, are engaged by spring elements 70 which are seated within retainer elements 72 secured to the mounting plate 54. It will therefore be apparent, that the spring elements 70 bias the lever elements 62 in a clockwise direction as viewed in FIGURE 3 in order to urge the rollers 68 into engagement with the edge of the workpiece and thereby apply a pressure thereto transverse to the direction of feed. The roller mounting plate assembly 66 is also provided with a forward tapering edge portion 74 in order to facilitate reception of the workpiece between the pressure applying assembly 40 and the roller fence 42.

Figure 7:
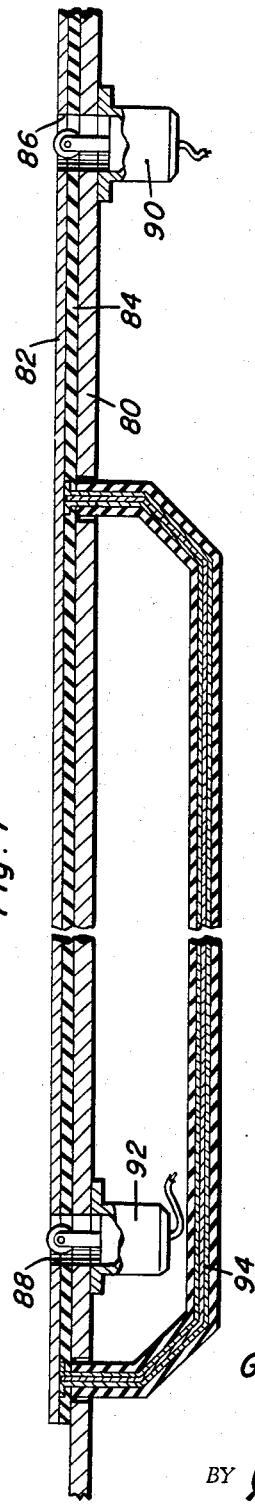
FIGURE 7 is a partial sectional view taken substantially through a plane indicated by section line 7—7 in FIGURE 4.

Referring now to FIGURE 4, it will be observed that the skate roller assembly 34 includes a plurality of rollers 76 rotatably mounted by spindles 78 which extend along axes disposed perpendicular to the direction of feed in order to rollingly guide movement of the workpiece in the direction of feed. The upper surfaces of the rollers 76 therefore extend slightly above the surface 14 presented by a plate member 80 within which the opening 36 is cut. A fixed aluminum supporting plate 82 is secured to the plate member 80 and non-conductively spaced therefrom by insulating material 84 so as to present a supporting surface substantially flush with the radially outer surfaces of the rollers 76. Fixed plate member 82 extends from the skate roller assembly 34 to the roller fence 42 and underlies the electrode 46. It will therefore be apparent that the spacing between the roller fence 42 and the skate roller assembly 34 determines the range of horizontal adjustment for the electrode 46 and the maximum width of the edge bands capable of being handled by the edge banding machine. As more clearly seen in FIGURE 7, two openings 86 and 88 are formed in the fixed plate member 82 aligned with the openings in the plate member 80 and the insulation 84. Microswitches 90 and 92 are mounted by the plate member 80 below the openings 86 and 88 so that the microswitch actuators may extend upwardly through the openings. The microswitches 90 and 92 are wired to the control circuit for the generator in order to set it into operation in response to reception of the edge band and workpiece on the supporting bed. Shielded electrical conductors 94 also extend through the plate member 80 and electrical contact established with the fixed plate member 82. The conductors 94 are wired to the generator 32 in order to establish ground through the plate member 82.

Figure 8:
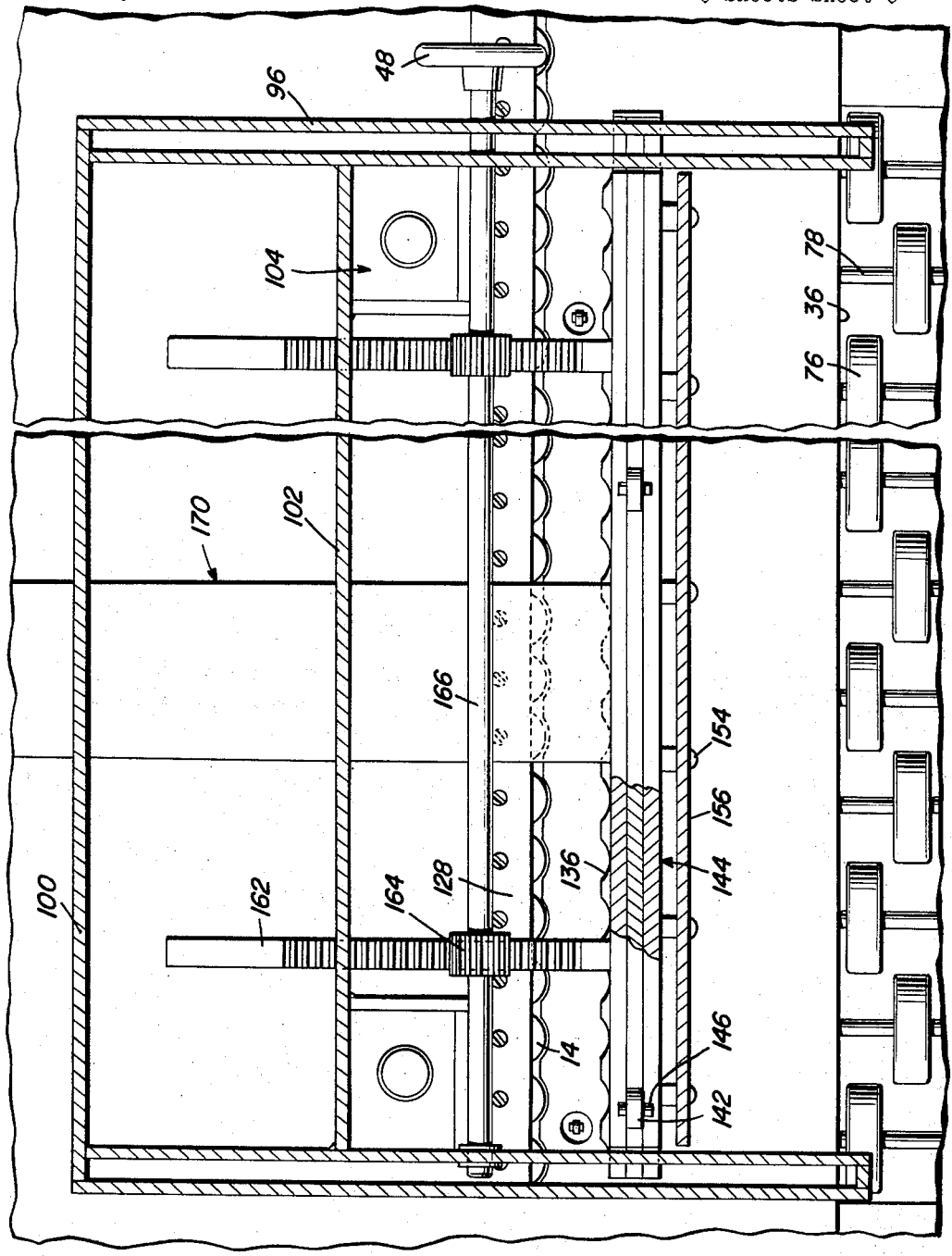
FIGURE 8 is a partial sectional view taken substantially through a plane indicated by section line 8—8 in FIGURE 4.

Referring now to FIGURES 4, 5 and 8, it will be observed that the electrode supporting head assembly 44 includes a pair of braced side walls 96 interconnected by a top wall 98 and an end wall 100. The side walls are also interconnected by a partition wall 102 to which a pair of internally threaded nut assemblies 104 are secured. An externally threaded screw shaft 106 is threadedly received in each of the nut assemblies and extends downwardly through openings in the plate members 80. Secured to each of the screw shafts below the plate member 80, is a helical worm wheel 108 in mesh with a pair of worm gears 110 secured to a vertical adjustment shaft 112 to which the vertical adjustment hand wheel 52 is connected. The lower end of the screw shafts extend through sleeves 114 mounted on a channel member 116 rigidly secured to the supporting bed assembly 12. Bearing members 118 are secured to the lower end of the screw shaft within the channel member 116 and are supported on ball bearing elements 120 which in turn are seated on bracket members 122 removably secured to the channel member 116. A lubricating passage 124 may be formed in the bearing member 118 for lubricating the bearing assembly formed for the lower end of the screw shaft. Rotation of the screw shaft by means of the adjustment shaft 112 drivingly connected to the screw shaft by the worm gearing will therefore vertically adjust the electrode supporting head assembly 44.

As shown in FIGURES 4 and 5, the roller fence includes a plurality of vertical rollers 126 rotatably mounted about vertical axes within a channel member which is elongated in the direction of feed of the workpiece. The channel member 128 is secured as by welding to the head assembly 44 so that it is vertically adjustable therewith upwardly from the lowermost position shown in FIGURE 4. The rollers 126 are made of a material such as rubber so as to guidingly engage the edge band being fed in the indicated direction of feed while resisting the workpiece pressure transmitted through the adhesive edge surface forming the glue line 50 between the workpiece 16 and the edge band 38 as aforementioned.

As more clearly seen in FIGURES 4, 6 and 8, the electrode 46 includes a contact pressure plate 130 having a lower contact surface engageable with the workpiece and the edge band along the glue line. The plate member 130 extends a substantial distance in the direction of feed and includes an upwardly extending inlet end portion 134 for guidingly receiving the workpiece and the edge band therebelow. A scalloped edge 136 is formed on the plate 130 confronting the rollers 126 of the roller fence for purposes to be hereafter explained. The pressure plate 130 is preferably made of aluminum and nonconductively spaced by the insulator 138 from the assembled pressure bars 140 to which the electrode plate member 130 is secured. A pair of guide posts 142 are secured to the pressure bars 140 and slidingly extend through vertical openings formed within an upper assembly of bar members 144 vertically fixed within the head assembly 44. Downward movement of the electrode plate 130 relative to the bar assembly 144 is limited by the pins 146 connected to the guide posts 142 abutting the upper edge of the bar assembly 144. Aligned spring retainer members 148 and 150 are secured to the lower and upper bar assemblies 140 and 144 so that a plurality of spring elements 152 seated in the retainer elements will urge the bar assemblies apart. It will therefore be apparent, that the head assembly 44 may be vertically adjusted to a position causing the electrode plate member 130 to engage the workpiece and the edge band with the desired amount of pressure determined by the vertical displacement of the electrode plate member 130 relative to the upper bar assembly 144 against the bias of the spring elements 152.

The upper bar assembly 144 is secured by the fastener assemblies 154 to an electrode shield member 156. Reduced longitudinal ends of the upper bar assembly 144 extend through slots 158 formed in the side walls 96 in order to accommodate horizontal adjustment of the electrode 46. The horizontal position of the electrode relative to the head assembly may therefore be gauged by means of an indicator 160 secured to one longitudinal end of the upper bar assembly 144 as more clearly seen in FIGURE 6, this end of the bar assembly extending beyond the side wall. A pair of rack members 162 are secured to the upper bar assembly and extends rearwardly therefrom. The rack members mesh with a pair of pinion gears 164 secured to the horizontal spacing shaft 166 to which the hand wheel 48 is connected. The horizontal spacing shaft 166 is rotatably mounted by the side walls of the head assembly as more clearly seen in FIGURE 8. It will therefore be apparent, that by rotation of the spacing shaft 166 the electrode 46 may be horizontally positioned between the roller fence 42 and the skate roller assembly 34 in order to bring it into alignment with the glue line between the workpiece and the edge band. Further, since the edge 136 of the electrode plate 130 is scalloped as aforementioned, the electrode may be brought into overlapping relation to the roller fence in order to accommodate edge bands of veneer thickness.

The output of the high frequency generator 32 is supplied to the electrode plate 130 so that the radio frequency energy emitted from the lower surface 132 of the electrode plate will establish a dielectric field which extends parallel to the banding edges a substantial distance in the direction of feed. As more clearly seen in FIGURE 10, the output of the generator is brought through an electrical conductor 168 to the electrode plate 130, the conductor being insulated by the sheathing assembly 170 which extends through an opening 172 in the end wall 100 of the head assembly 44 as more clearly seen in FIGURES 4 and 5.

From the foregoing description, the construction, operation and utility of the end edge banding machine of the present invention will be apparent. Operation of the machine may be reviewed with reference to FIGURE 11 showing side pressure being applied to the workpiece 16 by the pressure applying assembly 40 as the workpiece is being fed in the direction indicated by the arrow 18. The pressure applied to the workpiece is resisted by the roller fence 42 engaging the edge band 38 so that the workpiece and the edge band will be held in pressure engagement with each other at the same time that the adhesive is being rapidly set by the radio frequency energy emitted from the electrode plate 130. In view of the elongation of the electrode plate in the direction of feed and its yieldable mounting by the electrode supporting head assembly 44, rapid setting of the glue may be effected without limitation on the length of the edge being banded. Further, in view of the spacing control and the scalloped edge of the electrode plate overlapping the roller fence, the edge banding machine may accommodate edge bands of different widths including bands of veneer thickness. Also, workpieces of different thicknesses may be accommodated by the simultaneous vertical adjustment of the roller fence and the electrode 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a machine for setting adhesive between an edge surface of a workpiece and an edge band by passage of radio frequency energy through adhesive between said edge surface and the edge band, a supporting bed for the workpiece, means for feeding the workpiece on the bed in a direction parallel to said edge surface, electrode means having a pressure contact surface elongated in said direction of feed for establishing a dielectric field through the workpiece and the edge band extending parallel to the edge surface for a substantial distance in the direction of feed, pressure applying means yieldably mounted on the bed for exerting pressure on the workpiece transverse to said direction of feed, a roller fence engageable with said edge band for resisting said pressure transmitted through the edge surface to the edge band, electrode supporting means adjustably mounted by the bed for vertically spacing the pressure contact surface relative to the bed, means mounting the fence on the electrode supporting means for vertical adjustment with the electrode means to accommodate workpieces of different thickness, spacing control means operatively connected to the electrode means for adjustably positioning the pressure contact surface relative to the roller fence, said electrode means including a pressure plate on which said pressure contact surface is formed, and means yieldably mounting the pressure plate on the electrode supporting means for vertical displacement thereof, said pressure plate having a scalloped edge confronting the roller fence to permit positioning of the dielectric field in overlapping relation to the roller fence, whereby edge bands of veneer thickness may be bonded to the workpiece.

2. The combination of claim 1 wherein said supporting bed includes roller means supporting the workpiece in spaced relation to the fence and a fixed supporting plate extending between the roller means and the roller fence supporting the edge band and the workpiece adjacent the edge surface thereof, said electrode means being adjustably positioned between the roller means and the roller fence in parallel spaced relation to the fixed supporting plate.

3. In a machine for setting adhesive between an edge surface of a workpiece and an edge band, a supporting bed for the workpiece, means for feeding the workpiece on the bed in a direction parallel to said edge surface, electrode means for establishing an adhesive activating field through which the workpiece and the edge band are fed, pressure applying means yieldably mounted on the bed for exerting pressure on the workpiece transverse to said direction of feed and a roller fence engageable with said edge band for resisting said pressure transmitted through the edge surface to the edge band, said supporting bed including roller means supporting the workpiece in spaced relation to the fence and a fixed supporting plate extending between the roller means and the roller fence supporting the edge band and the workpiece adjacent the edge surface thereof.

4. In a machine for setting adhesive between an edge surface of a workpiece and an edge band by passage of radio frequency energy through adhesive between said edge surface and the edge band, a supporting bed for the workpiece, means for feeding the workpiece on the bed in a direction parallel to said edge surface, electrode means having a pressure contact surface elongated in said direction of feed for establishing a dielectric field through the workpiece and the edge band extending parallel to the edge surface for a substantial distance in the direction of feed, pressure applying means yieldably mounted on the bed for exerting pressure on the workpiece transverse to said direction of feed and a roller fence engageable with said edge band for resisting said pressure transmitted through the edge surface to the edge band, said supporting bed including roller means supporting the workpiece in spaced relation to the fence and a fixed supporting plate extending between the roller means and the roller fence supporting the edge band and the workpiece adjacent the edge surface thereof, said electrode means being adjustably positioned between the roller means and the roller fence in parallel spaced relation to the fixed supporting plate, spacing control means operatively connected to the electrode means for adjustably positioning the pressure contact surface relative to the roller fence, said electrode means including a pressure plate on which said pressure contact surface is formed, means yieldably mounting the pressure plate on the bed for vertical displacement thereof, said pressure plate having a scalloped edge confronting the roller fence to permit positioning of the dielectric field in overlapping relation to the roller fence, whereby edge bands of veneer thickness may be banded to the workpiece.

5. The combination of claim 3, including spacing control means operatively connected to the electrode means for adjustable positioning thereof in overlapping relation to the roller fence, whereby edge bands of veneer thickness may be banded to the workpiece.

6. In a machine for setting adhesive between an edge surface of a workpiece and an edge band, electrode means for establishing an adhesive activating energy field having an elongated plate overlying the edge surface and edge band, guide means in engagement with said edge band for guiding movement thereof through said energy field having a plurality of spaced rollers, and spacing control means operatively connected to the electrode means for adjustably positioning the plate relative to the rollers, said plate being provided with a scalloped edge confronting the rollers permitting the positioning of the electrode means in overlapping relation to the guide means.

References Cited

UNITED STATES PATENTS

| 1,916,134 | 6/1933 | Dike et al. | 156—504 |
| 2,675,838 | 4/1954 | Hickok et al. | 156—380 |
| 2,908,600 | 10/1959 | Nicholson | 156—380 |

DOUGLAS J. DRUMMOND, *Primary Examiner.*